United States Patent [19]

Yamamoto et al.

[11] Patent Number: 4,785,491
[45] Date of Patent: Nov. 22, 1988

[54] ROTARY AND RECIPROCATING DRIVE DEVICE

[75] Inventors: Tokihiko Yamamoto, Toyota; Nozomu Torii, Hekinan, both of Japan

[73] Assignee: Aisin Seiki Kabushiki Kaisha, Kariya, Japan

[21] Appl. No.: 19,209

[22] Filed: Feb. 26, 1987

[30] Foreign Application Priority Data

Mar. 31, 1986 [JP] Japan .................................. 61-73336

[51] Int. Cl.$^4$ ............................ A47L 1/02; B60S 1/06; F16H 25/08
[52] U.S. Cl. ................................. 15/250.20; 74/89.15
[58] Field of Search ............. 15/250.2, 250.19, 250.21; 74/89.15, 424.8 R

[56] References Cited

U.S. PATENT DOCUMENTS

| | | | |
|---|---|---|---|
| 4,635,491 | 1/1987 | Yamano | 74/89.15 |
| 4,649,764 | 3/1987 | Meade | 74/89.15 |
| 4,698,872 | 10/1987 | Watanabe et al. | 15/250.2 |

FOREIGN PATENT DOCUMENTS

| | | | |
|---|---|---|---|
| 3600454 | 7/1956 | Fed. Rep. of Germany | 15/250.2 |
| 3428710 | 2/1986 | Fed. Rep. of Germany | 15/250.2 |
| 59-167349 | 9/1984 | Japan . | |

Primary Examiner—Harvey C. Hornsby
Assistant Examiner—Scott J. Haugland

[57] ABSTRACT

A rotary and reciprocating drive device applied to such as for example, a windshied wiper for automobiles includes a drive shaft, a slide shaft, a nut member driven by a motor, a screw shaft engaged with the nut member and a connecting member connecting the slide and screw shafts wherein the connecting member allows reciprocating movement of the slide shaft relative to the drive shaft but prevents the unitary rotation of the slide and screw shafts.

4 Claims, 3 Drawing Sheets

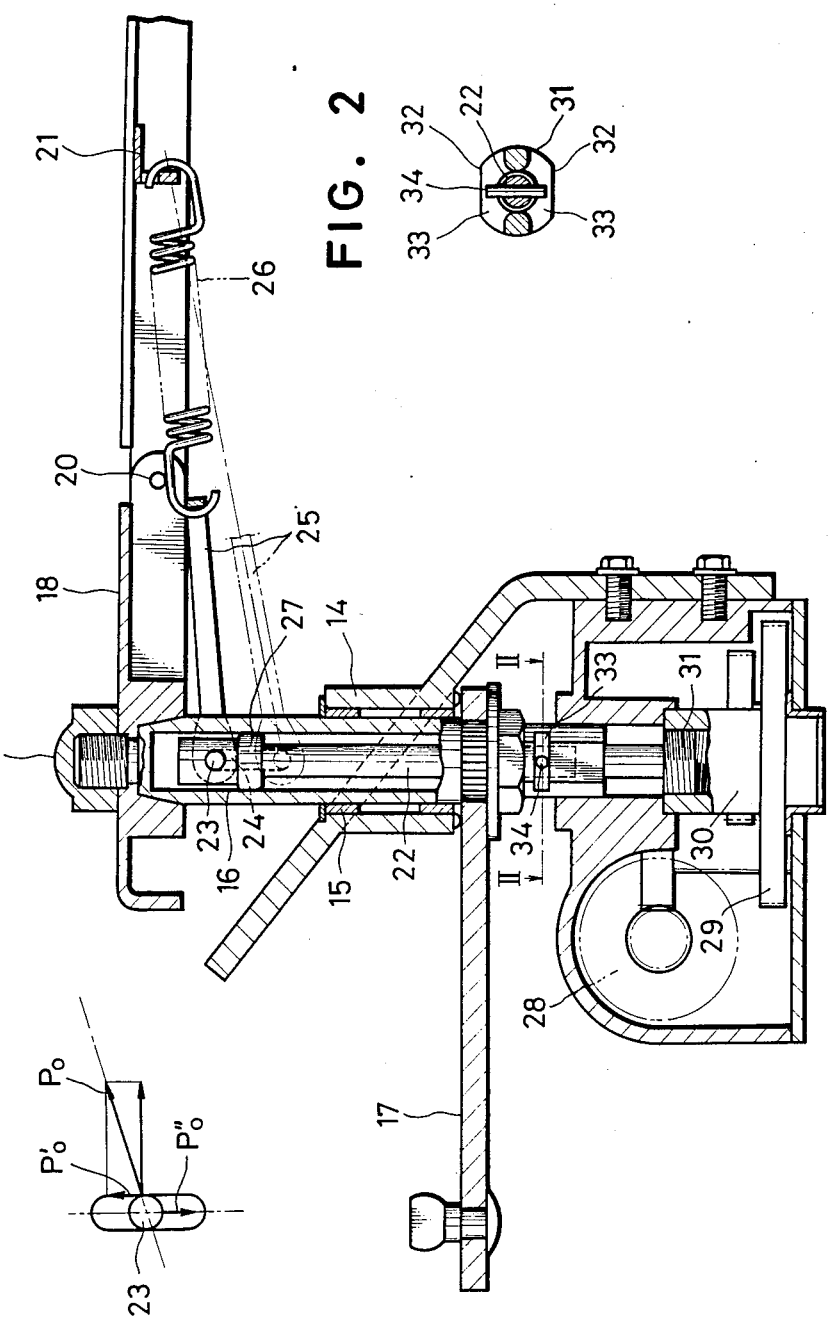

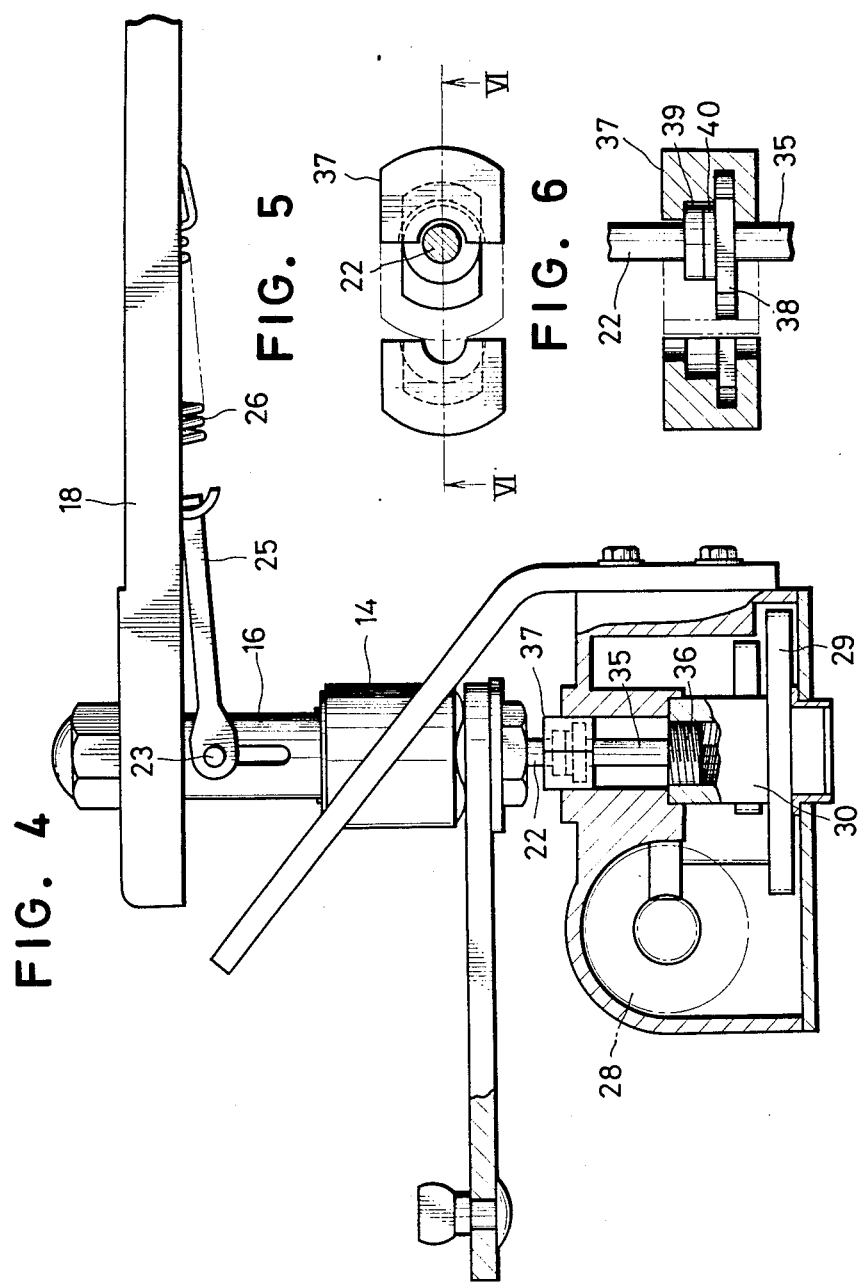

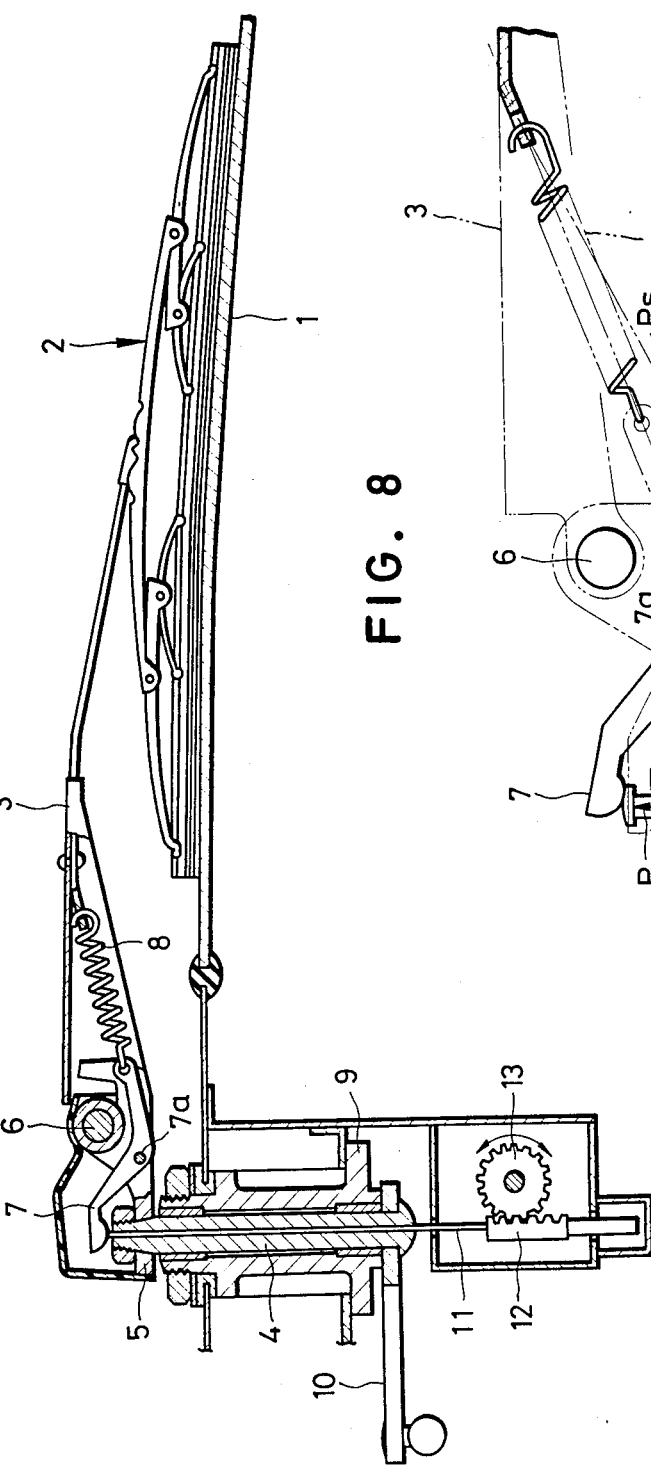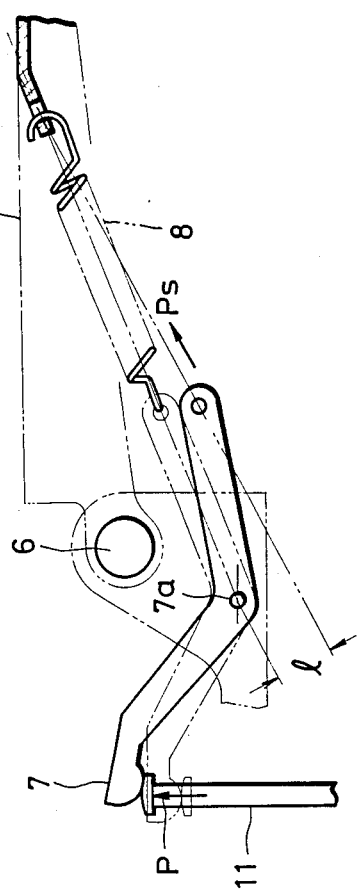
FIG. 7
FIG. 8

ROTARY AND RECIPROCATING DRIVE DEVICE

BACKGROUND OF THE INVENTION

1. Field of the Invention

This invention relates to a rotary and reciprocating device and more particularly to a rotary and reciprocating drive device used in, such as, for example, wiper devices for vehicle windshields.

2. Statement of Prior Art

As an example of a conventional rotary and reciprocating drive device, a windshield wiper device is shown in FIGS. 7 and 8, wherein, wiper blade 2 is rotatable in a predetermined or wiped area on a windshield 1 and also is in contact therewith with a certain pressure. The blade 2 is supported on a wiper arm 3 which is rotatably mounted on a drive arm 5 through a pin 6. The drive arm 5 is secured to a top end of a rotatable shaft 4 as is clearly shown in FIG. 7. A bell crank 7 is rotatably mounted on the drive arm 5 through pin 7a. A spring 8 is disposed between one end of the wiper arm 3 and end of the bell crank 7.

The rotatable shaft 4 is rotatably supported on a bracket 9 through bearings. The bracket 9 is secured to a vehicle fixed part. The lower end of the shaft 4 is connected to a link 10 for unitary rotation when the link 10 is rotated. This movement is then transmitted to the drive arm 5 to rotate the same and further to the wiper blade 2 via the wiper arm 3 thereby to wipe the outer surface of the windshield 1 with a rubber blade on the wiper blade 2.

A central bore is provided in the rotatable shaft 4 and a rod 11 is inserted into the bore and extending to be in contact with the other end of the bell crank 7 at one end. A rack 12 is provided at the other end of the rod 11 to be in engagement with a pinion 13 which is secured on the bracket 9.

When the contact pressure between the windshield 1 and the wiper blade 2 has to be changed for adjustment, the pinion 13 is rotated to move the rod 11 in axial direction to rotate the bell crank 7 around the pin 7a thereby to change the biasing force of spring 8. In order to change the contact pressure between the windshield 1 and the wiper blade 2, it is necessary to move rod 11 in axial direction to rotate the bell crank 7. The thrust force P needed to rotate the pinion 13 should be sufficient for overcoming the moment Ps X1 (see FIG. 8 in which the bell crank 7 is being rotated to the position illustrated with the imaginary line).

SUMMARY OF THE INVENTION

According to the conventional device explained above, it is necessary to give a considerably big force to the pinion and therefore, to bell crank.

It is, therefore, an object of the present invention to provide an improved rotary and reciprocating drive device which can obviate the above conventional drawbacks.

It is another object of the present invention to provide an improved rotary and reciprocating device which needs a small force to rotate or reciprocate a device such as a windshield wiper for vehicles.

According to the present invention, the device includes a rotatable drive shaft, a slide shaft reciprocable along and rotatable with the drive shaft, a nut member driven by a motor, a screw shaft engaged with the nut member and a connecting member which connects the slide shaft with the screw shaft, whereby the connecting member allows the rotational movement of the slide shaft and at the same time allows the reciprocating movement thereof.

BRIEF DESCRIPTION OF THE DRAWINGS

These and further objects of the invention will become apparent with reference to the drawings in which;

FIG. 1 is a cross sectional view of the present invention applied to a windshield wiper device of a vehicle;

FIG. 2 is a cross sectional view taken along the line 11—11 of FIG. 1;

FIG. 3 is a schematic view illustrating the relationship among the forces applied;

FIG. 4 is similar to FIG. 1 but showing another embodiment of the invention;

FIG. 5 is a plan view of the screw shaft to FIG. 4;

FIG. 6 is a cross sectional view taken along the line 1V—1V of FIG. 5;

FIG. 7 is a view similar to FIG. 1, but showing a conventional device; and

FIG. 8 is a schematic view illustrating the relationship of force applied to the device of FIG. 7.

DETAILED DESCRIPTION OF THE EMBODIMENTS OF THE INVENTION

First FIGS. 1–3 will be explained. In the drawings, a drive shaft 16 is rotatably supported on a bracket 14 through bearings 15. A link 17 is secured to the drive shaft 16 for unitary rotation therewith. A drive arm 18 is secured to the top end of the drive shaft 16 with a nut member 19. Wiper arm 21 is connected to the drive arm 18 through pin 20.

A slide shaft 22 is slidably inserted into the hollow portion of the drive shaft 16 and a pin 23 provided on the slide shaft 22 is extended outward from the drive shaft 16 through an elongated slot 24 provided on the drive shaft 16. One end of a link 25 is engaged with the pin 23 and the other end thereof is engaged with one end of a spring 26 the other end of which is connected to the wiper arm 21. Thus the wiper arm and accordingly blade (not shown) receives a downward partial force of the biasing force of spring 26 thereby to keep the blade in contact with a windshield (not shown). Slide shaft 22 is slidable within the range of the slot 24 guided by the pin 23. A guide member 27 is provided for the reciprocating movement of the slide shaft 22 relative to the drive shaft 16. A motor 28 secured to the bracket 14 drives a nut member 30 supported by the bracket 14 through a reduction gear train 29. The nut member 30 is engaged with a screw shaft 31 which includes a flat side surfaces 32 as shown in FIG. 2. The surfaces 32 are in contact with the corresponding surfaces of the bracket 14 to prevent rotation relative to the bracket 14, but is reciprocable in axial direction. When the nut member 30 is rotated by the motor 28, the screw shaft 31 is moved in axial direction (in vertical direction in FIG. 1). The lower end of the slide shaft 22 is inserted into the bore of the screw shaft 31. A pin 34 is secured to the slide shaft 22 and the pin 34 is received in open windows 33 provided on the screw shaft 31. Thus, the vertical movement of the screw shaft 31 is transmitted to the slide shaft 22 via the pin 34 thereby to change the position of pin 23 relative to the drive shaft 16.

When the slide shaft 22 is moved downward to move the pin 23 downward to move the link 25 to the position shown in imaginary line. This movement will make a contact pressure between the wiper blade and the windshield more stronger. As is shown in FIG. 3, a partial force Po' is generated against the biasing force Po of the spring 26, and therefore, only the force Po" is needed for driving the slide shaft 22.

The limited rotational movement of the link 17 rotates the drive shaft 16 in unitary and the slide shaft 22 is rotated by the pin 23 in the same manner. However, the screw shaft 31 will not be rotated due to the idle movement of the pin 34 within the open windows 33. Thus, the slide shaft 22 can be both rotated and reciprocated by the screw shaft 31.

Referring to another embodiment with reference to FIGS. 4-6, most of the elements appearing in this embodiment are similar or same with those of the previous one and therefore detail explanation will be omitted. Screw shaft 35 includes a main body 36 and case 37 and one end of the main body 36 is engaged with the nut member 30 and the other end is in shape of ellipse 38. The lower end of the slide shaft 22 is in circular shape and between the ellipse and circular shape portions, a low friction material 40 is disposed. These three (ellipse portion, low friction material, and circular portion) are positioned in a space provided in the case 37 as shown in FIG. 6. Thus rotational movement of the slide shaft 22 will rotate the circular portion 39 thereof idly in the case 37. The vertical movement of the main body 36 of the slide shaft 22 is transmitted to the slide shaft 22 through ellipse portion 38 and case 37 thereby to change the position of the slide shaft 22 relative to the drive shaft 16 as is the same with the previous embodiment.

According to the present invention, a connecting portion between the motor and the slide shaft has been improved to effect both the rotational and reciprocable movements thereby to obtain a big contact pressure between the windshield and wiper blade with a relatively low motor output. Further, motor can be disposed on the fixed portion in the device.

As many apparently widely different embodiments of the present invention can be made without departing from the spirit and scope thereof, it is to be understood that the invention is not limited to the specific embodiments thereof except as defined in the appended claims.

What we claim is:

1. A rotating and reciprocating drive device comprising:
   a rotatable drive shaft having a hollow inner bore;
   a slide shaft slidably disposed in said hollow inner bore of said rotatable drive shaft for translation along said bore and rotation with the drive shaft;
   a screw shaft including a first end and a second end, said first end including an external threaded portion;
   a nut member having an internal threaded portion in threaded engagement with said external threaded portion of said screw shaft;
   means for rotating said nut member relative to said external threaded portion of said screw shaft to impart translational motion to the screw shaft;
   connecting means for connecting said slide shaft to said screw shaft including an opening through said second end of said screw shaft and a pin secured to one end of said slide shaft, said pin engaging said opening through said screw shaft for transmitting the translational motion of said screw shaft to said slide shaft and for permitting the rotation of said slide shaft relative to said screw shaft.

2. A rotating and reciprocating drive device comprising:
   (A) a rotatable drive shaft having a hollow inner bore;
   (B) a slide shaft slidably disposed in said hollow inner bore of said rotatable drive shaft for translation along said bore;
   (C) a screw shaft including a first end and a second end, said first end including an external threaded portion;
   (D) a nut member having an internal threaded portion in threaded engagement with said external threaded portion of said screw shaft;
   (E) means for rotating said nut member relative to said external threaded portion of said shaft; and
   (F) connecting means for connecting said slide shaft to said screw shaft including:
      (i) a circular portion at one end of said slide shaft;
      (ii) an elliptical portion at said second end of said screw shaft;
      (iii) a case member being in constrainable engagement with said elliptical portion for preventing rotation of said elliptical portion relative to said case member and transmitting translational movement from said elliptical portion to said case member, said case member being in rotatable engagement with said circular portion for allowing rotational movement of said circular portion relative to said case member and transmitting translational movement from said case member to said circular portion; and
      (iv) a low friction member disposed between said circular portion and elliptical portion for allowing relative rotational movement between said circular portion and said elliptical portion.

3. A rotating and reciprocating drive device for a windshield wiper arm supported by a stationary member of a vehicle, comprising:
   a drive shaft rotatably supported by the stationary member of the vehicle, said drive shaft being hollow and having an elongated slot;
   a slide shaft, including a first and second end, translatable within and rotatable with said drive shaft;
   a pin fixed to said first end of said slide shaft, said pin passing through said elongated slot;
   a drive arm secured to said drive shaft and connected to the wiper arm of the vehicle;
   spring means connected at one end to said wiper arm and at the other end to said pin for applying a force to said wiper arm;
   a screw shaft including a first end and a second end, said first end including an external threaded portion;
   a nut member having an internal threaded portion in threaded engagement with said external threaded portion of said screw shaft;
   means for rotating said nut member relative to said external threaded portion of said screw shaft to impart translational motion to the screw shaft;
   connecting means for connecting said slide shaft to said screw shaft including an opening through said second end of said screw shaft and a pin secured to said second end of said slide shaft, said pin engaging said opening through said screw shaft for transmitting the translational motion of said screw shaft to said slide shaft and for permitting the rotation of said slide shaft relative to said screw shaft.

4. A rotating and reciprocating drive device for a windshield wiper arm supported by a stationary member of a vehicle, comprising:
- (A) a drive shaft rotatably supported by the stationary member of the vehicle, said drive shaft being hollow and having an elongated slot;
- (B) a slide shaft, including a first and second end, translatable within and rotatable with said drive shaft;
- (C) a pin fixed to said first end of said slide shaft, said pin passing through said elongated slot;
- (D) a drive arm secured to said drive shaft and connected to the wiper arm of the vehicle;
- (E) spring means connected at one end to said wiper arm and at the other end to said pin for applying a force to said wiper arm;
- (F) a screw shaft including a first end and a second end, said first end including an external threaded portion;
- (G) a nut member having an internal threaded portion in threaded engagement with said external threaded portion of said screw shaft;
- (H) means for rotating said nut member relative to said external threaded portion of said shaft; and
- (I) connecting means for connecting said slide shaft with said screw shaft including:
  - (i) a circular portion at one end of said slide shaft;
  - (ii) an elliptical portion at said second end of said screw shaft;
  - (iii) a case member being in constrainable engagement with said elliptical portion for preventing rotation of said elliptical portion relative to said case member and transmitting translational movement from said elliptical portion to said case member, said case member being in rotatable engagement with said circular portion for allowing rotational movement of said circular portion relative to said case member and transmitting translational movement from said case member to said circular portion; and
  - (iv) a low friction member disposed between said circular portion and elliptical portion for allowing relative rotational movement between said circular portion and said elliptical portion.

* * * * *

UNITED STATES PATENT AND TRADEMARK OFFICE
CERTIFICATE OF CORRECTION

PATENT NO. : 4,785,491
DATED : November 22, 1988
INVENTOR(S) : Tokihiko YAMAMOTO and Nozomu TORII It is certified that error appears in the above-identified patent and that said Letters Patent is hereby corrected as shown below:

```
In the Abstract:  Line 2, "windshied"   should
read --windshield--.
```

Signed and Sealed this

Second Day of May, 1989

Attest:

DONALD J. QUIGG

Attesting Officer

Commissioner of Patents and Trademarks